Patented June 18, 1946

2,402,129

UNITED STATES PATENT OFFICE 2,402,129

PROCESS FOR ESTERIFYING ACYLOXY CARBOXYLIC ACIDS

Edward M. Filachione, Philadelphia, Pa., assignor to the United States of America, as represented by the Secretary of Agriculture No Drawing. Application December 27, 1943, Serial No. 515,800

1 Claim. (Cl. 260—484)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to the esterification of acyloxy carboxylic acids, and particularly to methods for esterifying alpha-acetoxypropionic acid, which can be made in quantity and at low cost from lactic acid.

It is known that esters of acyloxy carboxylic acids can be made by acylating hydroxyesters such as methyl lactate or ethyl citrate. For example, methyl alpha-acetoxypropionate, which yields methyl acrylate on pyrolysis, can be made by acetylating methyl lactate with acetic anhydride or ketene (Smith et al., Ind. Eng. Chem. 34, 473-9 (April, 1942)). Methyl alpha-acetoxypropionate has also been made by treating alpha-acetoxypropionyl chloride with methanol. Previous methods for making esters of acyloxy carboxylic acids have the disadvantage, however, of requiring such materials as acid anhydrides, acid chlorides, and ketene or ketene derivatives, which are more expensive than the parent carboxylic acids.

An object of this invention is to provide an improved method for converting acyloxy carboxylic acids into their esters by direct esterification.

A further object is to provide a continuous method for esterifying acyloxy carboxylic acids, such as alpha-acetoxypropionic acid, with alcohols.

Other objects will appear from the following description:

I have found that acyloxy carboxylic acids can be esterified effectively by passing the acids and alcohol vapors countercurrently through a tower or column heated above the boiling point of the alcohol but below the boiling point of the desired ester. Moreover, I have found that this method of esterification can be carried out continuously. I have also found that the occurrence of side reactions leading to the formation of undesired byproducts can be prevented or minimized by the operations which are a part of this invention.

The methods used in the present invention to esterify acyloxy carboxylic acids, which are particularly applicable to the esterification of alpha-acetoxypropionic acid, are described below with reference to this acid.

Slightly different techniques were used in conducting the esterification at atmospheric pressure and under vacuum. When the esterifications were carried out under reduced pressures, a mixture of alpha-acetoxypropionic acid, methanol and sulfuric acid was added dropwise into the top of a Pyrex glass tower (1" x 48") packed with ¼" porcelain Berl saddles and electrically heated. The temperature of the column was controlled and recorded automatically. Methanol was passed into a heated vaporizing flask and the vapor issuing from this flask was passed into the bottom of the packed tower. The methanol vapor was passed through the tower as long as alpha-acetoxypropionic acid was being passed into the column, and until the "dry" appearance of the packing indicated that all the acid had reacted. The vapors withdrawn from the top of the tower, which consisted of methanol, methyl alpha-acetoxypropionate and other volatile products, were passed into the center of a steam-jacketed distillation column packed with small Berl saddles. Methanol and water vapors which passed through this stripping still were condensed. The products of higher boiling points, which were collected at the bottom of the distilling column, were redistilled in a vacuum to determine the amounts of methyl lactate and methyl alpha-acetoxypropionate obtained. Yields of methyl alpha-acetoxypropionate as high as 72 to 75 percent were obtained at the temperatures of 80° to 100° C.

When alpha-acetoxypropionic acid was esterified with methanol vapor in the packed tower under atmospheric pressure, the technique was slightly modified. As before, methanol vapor and alpha-acetoxypropionic acid were passed countercurrently through the tower, and the vapors withdrawn from the top of the tower were passed into the center of the steam-jacketed distilling column. The methanol distilling from the top of the column was condensed and returned through a liquid seal to the heated vaporizing flask. When the esterification was carried out at temperatures below 108° C., the material collected at the bottom of the distilling column contained water and some methyl lactate and methyl alpha-acetoxypropionate, but most of the esters passed downward through the esterification tower and were collected in a flask at the base. The contents of the flasks located at the bottom of both the distillation and esterification columns were distilled under reduced pressure to determine the yields of methyl lactate and methyl alpha-acetoxypropionate.

When the esterification was carried out in the packed tower under atmospheric pressure and at temperatures above approximately 108° C., the methanol vapor was recycled and passed through the tower until the appearance of the tower indicated that all the alpha-acetoxypropionic acid had reacted and passed through the top of the tower into the distilling column. The products collected at the bottom of the distilling column were then distilled to separate the products.

Results obtained under the conditions described above are set forth in Table I.

ica or alumina, may be used as packing to promote the esterification. Various types of esterification and distillation equipment may be used, including bubble cap columns. The mixed vapors withdrawn from the top of the tower may be distilled continuously or in batches to recover the desired ester and unchanged alcohol. Although an esterification catalyst is preferably used, the process may be operated in the absence of such a catalyst.

Table I.—Reaction of alpha-acetoxypropionic acid with methanol vapor in a packed tower

| Exp't No. | Acid, moles | H₂SO₄, ml. | Temp., °C | Pressure, mm. | Time, hrs. | Methyl lactate | | Methyl alpha-acetoxypropionate | |
|---|---|---|---|---|---|---|---|---|---|
| | | | | | | Conversion, per cent | Yield, per cent | Conversion, per cent | Yield, per cent |
| 296 | 0.5 | 0.25 | 97-101 | 90-110 | 1.33 | -------- | 22 | -------- | 58 |
| 297 | 0.5 | 0.10 | 95-102 | 90-110 | 1.2 | -------- | 10 | -------- | 72 |
| 307 | 1.0 | 0.20 | 82-87 | 90-110 | 3.8 | -------- | 11 | -------- | 75 |
| 308 | 1.0 | 0.20 | 93-98 | 78-95 | 2.6 | -------- | 17 | -------- | 72 |
| 309 | 1.0 | 0.20 | 98-118 | 95-130 | 2.1 | -------- | 9 | -------- | 72 |
| 310 | 1.0 | 0.20 | 115-122 | 70-110 | 1.3 | -------- | 8 | -------- | 65 |
| 311 | 0.5 | None | 115-122 | 85-105 | 6.5 | 5 | 8 | 33 | 51 |
| 295 | 1.0 | 0.25 | 122-135 | Atmospheric | 1.8 | -------- | 47 | -------- | 34 |
| 312 | 1.0 | None | 128-133 | do | 3.0 | 15 | 24 | 39 | 62 |
| 313 | 1.0 | 0.02 | 128-136 | do | 2.0 | 21 | 25 | 46 | 55 |
| 324 | 1.0 | 0.05 | 84-79 | do | 0.5 | 3 | 7 | 20 | 50 |
| 326 | 1.0 | 0.05 | 82-88 | do | 0.7 | 6 | 10 | 35 | 60 |
| 327 | 1.0 | 0.05 | ca-95 | do | 0.6 | 6 | 11 | 28 | 54 |
| 328 | 1.0 | 0.05 | 101-108 | do | 0.7 | 10 | 19 | 31 | 60 |
| 329 | 1.0 | 0.05 | 74-79 | do | 2.5 | 7 | 14 | 35 | 71 |

Various modifications may be made in practicing this invention. For example, various pressures may be used in the esterification equipment and various esterification catalysts, such as alkyl sulfates, hydrogen chloride, zinc chloride, phosphoric acid and aryl sulfonic acids, may be used. Other liquids, such as benzene, cyclohexane, and ether may be used to assist the distillation of the esterification products. The esterification tower or chamber may be packed with Berl saddles, Raschig rings, beads, crushed coke or with other packing materials. Active materials, such as silica or alumina, may be used as packing to promote the esterification.

Having thus described my invention, I claim:

The process of preparing methyl alpha-acetoxypropionate and methyl lactate simultaneously, which comprises passing alpha-acetoxypropionic acid and methanol vapors counter-currently through a reactor maintained at a temperature above the boiling point of methanol but below the boiling point of the formed methyl alpha-acetoxypropionate, and recovering the methyl alpha-acetoxypropionate and the methyl lactate.

EDWARD M. FILACHIONE.